US008271047B2

(12) United States Patent  
Kim et al.

(10) Patent No.: US 8,271,047 B2  
(45) Date of Patent: Sep. 18, 2012

(54) MOBILE TERMINAL USING FLEXIBLE DISPLAY AND METHOD OF CONTROLLING THE MOBILE TERMINAL

(75) Inventors: Jong Hwan Kim, Seoul (KR); Mee Young Kim, Seoul (KR); Wan Chang Ryu, Seoul (KR); Seung Jin Lee, Seoul (KR)

(73) Assignee: LG Eletronics Inc., Seoul (KR)

( * ) Notice: Subject to any disclaimer, the term of this patent is extended or adjusted under 35 U.S.C. 154(b) by 502 days.

(21) Appl. No.: 12/506,899

(22) Filed: Jul. 21, 2009

(65) Prior Publication Data

US 2010/0120470 A1 May 13, 2010

(30) Foreign Application Priority Data

Nov. 10, 2008 (KR) ........................ 10-2008-0111151

(51) Int. Cl.
*H04B 1/38* (2006.01)
(52) U.S. Cl. ........ 455/566; 345/156; 348/836; 715/810; 715/823; 715/825; 715/830
(58) Field of Classification Search .................. 455/455, 455/566; 715/708; 438/15, 17; 345/1.3, 345/104, 206, 178, 87, 156, 581, 173
See application file for complete search history.

(56) References Cited

U.S. PATENT DOCUMENTS

| | | | |
|---|---|---|---|
| 6,307,751 B1* | 10/2001 | Bodony et al. | 361/749 |
| 6,377,324 B1* | 4/2002 | Katsura | 349/58 |
| 7,109,967 B2* | 9/2006 | Hioki et al. | 345/104 |
| 7,369,209 B2* | 5/2008 | Kinoshita et al. | 349/158 |
| 7,622,863 B2* | 11/2009 | Seo et al. | 313/506 |
| 2006/0238494 A1* | 10/2006 | Narayanaswami et al. | 345/156 |
| 2006/0267925 A1* | 11/2006 | Sakamaki et al. | 345/104 |
| 2008/0165202 A1* | 7/2008 | Brodersen et al. | 345/581 |
| 2008/0192020 A1* | 8/2008 | Kang et al. | 345/173 |
| 2008/0303782 A1* | 12/2008 | Grant et al. | 345/156 |
| 2009/0019401 A1* | 1/2009 | Park et al. | 715/841 |
| 2009/0051830 A1* | 2/2009 | Matsushita et al. | 348/836 |
| 2009/0059579 A1* | 3/2009 | Shin et al. | 362/231 |

* cited by examiner

*Primary Examiner* — Jean Gelin
*Assistant Examiner* — Mahendra Patel
(74) *Attorney, Agent, or Firm* — Birch, Stewart, Kolasch & Birch, LLP

(57) ABSTRACT

A mobile terminal equipped with a flexible first display module and a second display module capable of receiving a touch input and a method of controlling the mobile terminal are provided. The method includes displaying an operating screen on the first display module and displaying an operation control menu on the second display module; determining whether the first display module is bent or folded; and choosing one of a plurality of menu items of the operation control menu corresponding to a bent or folded portion of the first display module. Therefore, it is possible to control various operations performed by the mobile terminal according to whether the first display module is bent or folded.

21 Claims, 17 Drawing Sheets

MOBILE TERMINAL USING FLEXIBLE DISPLAY AND METHOD OF CONTROLLING THE MOBILE TERMINAL

CROSS-REFERENCE TO RELATED APPLICATION

This application claims the priority benefit of Korean Patent Application No. 10-2008-0111151, filed on Nov. 10, 2008 in the Korean Intellectual Property Office, the disclosure of which is incorporated herein by reference.

BACKGROUND OF THE INVENTION

1. Field of the Invention

The present invention relates to a mobile terminal and a method of controlling the mobile terminal, and particularly, to a mobile terminal and a method of controlling the mobile terminal which can control various operations performed by the mobile terminal using a flexible display.

2. Description of the Related Art

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless Internet services and have thus evolved into multimedia players.

Various attempts have been made to realize such complicated functions as hardware devices or software programs. For example, various user interface (UI) environments, in which users are allowed to easily search for and choose desired functions, have been developed. In addition, the demand for various designs for mobile terminals such as a double-sided liquid crystal display (LCD), a flexible display, or a full touch screen has steadily grown due to a growing tendency of considering mobile terminals as personal items that can represent personal individuality.

Flexible displays are display devices that are flexible enough to be folded or rolled up. However, the benefits of the flexibility of flexible displays have not yet been proven.

Therefore, it is necessary to develop ways to effectively input data to or output data from a mobile terminal equipped with a flexible display using the flexibility of the flexible display and thus to efficiently control the operation of the mobile terminal.

SUMMARY OF THE INVENTION

The present invention provides a mobile terminal and a method of controlling the mobile terminal which can control various operations performed by the mobile terminal according to whether a flexible display is bent or folded.

According to an aspect of the present invention, there is provided a method of controlling a mobile terminal equipped with a flexible first display module and a second display module capable of receiving a touch input, the method including displaying an operating screen on the first display module and displaying an operation control menu on the second display module; determining whether the first display module is bent or folded; and choosing one of a plurality of menu items of the operation control menu corresponding to a bent or folded portion of the first display module.

According to another aspect of the present invention, there is provided a mobile terminal including a first display module configured to be flexible and display an operating screen; a second display module configured to be able to receive a touch input and display an operation control menu; a sensing unit configured to determine whether the first display module is bent or folded; and a controller configured to choose one of a plurality of menu items of the operation control menu corresponding to a bent or folded portion of the first display module based on data provided by the sensing unit.

According to another aspect of the present invention, there is provided a method of controlling a mobile terminal equipped with a flexible first display module and a second display module capable of receiving a touch input, the method including displaying an operating screen corresponding to a current operating mode on the first display module; and if the first display module is bent or folded, displaying an operation control menu that can be executed in the current operating mode on the second display module.

According to another aspect of the present invention, there is provided a mobile terminal including a first display module configured to be flexible and display an operating screen corresponding to a current operating mode; a second display module configured to be able to receive a touch input; a sensing unit configured to determine whether the first display module is bent or folded; and a controller configured to display an operation control menu that can be executed in the current operating mode on the second display module if data provided by the sensing unit indicates that the first display module is bent or folded.

According to another aspect of the present invention, there is provided a method of controlling a mobile terminal equipped with a flexible first display module and a second display module capable of receiving a touch input, the method including displaying a first operating-mode screen on the first display module; if the first display module is bent or folded, displaying a second operating-mode screen on the second display module; and if the first display module is unbent or unfolded, displaying the second operating-mode screen on the first display module.

According to another aspect of the present invention, there is provided a mobile terminal including a first display module configured to be flexible and display a first operating-mode screen; a second display module configured to be able to receive a touch input; a sensing unit configured to determine whether the first display module is bent or folded; and a controller configured to display a second operating-mode screen on the second display module if data provided by the sensing unit indicates that the first display module is bent or folded, and display the second operating-mode screen on the first display module if data provided by the sensing unit indicates that the first display module is unbent or unfolded.

According to another aspect of the present invention, there is provided a method of controlling a mobile terminal equipped with a flexible first display module and a second display module capable of receiving a touch input, the method including displaying an operating screen including an operation control menu on the first display module; if the first display module is bent or folded, displaying the operation control menu on the second display module by scrolling the operation control menu; and if one of a plurality of menu items of the operation control menu is chosen by being touched, performing an operation corresponding to the chosen menu item.

According to another aspect of the present invention, there is provided a mobile terminal including a first display module configured to be flexible and display an operating screen including an operation control menu; a second display module configured to be able to receive a touch input and connected to the first display module; a sensing unit configured to determine whether the first display module is bent or folded; and a controller configured to display the operation control menu on the second display module by scrolling the operation control menu if data provided by the sensing unit indicates that the first display module is bent or folded, the controller controlling an operation corresponding to the chosen menu item to be performed if one of a plurality of menu items of the operation control menu is chosen by being touched.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), or a navigation device. In this disclosure, the terms 'module' and 'unit' are used interchangeably.

Figure 1:
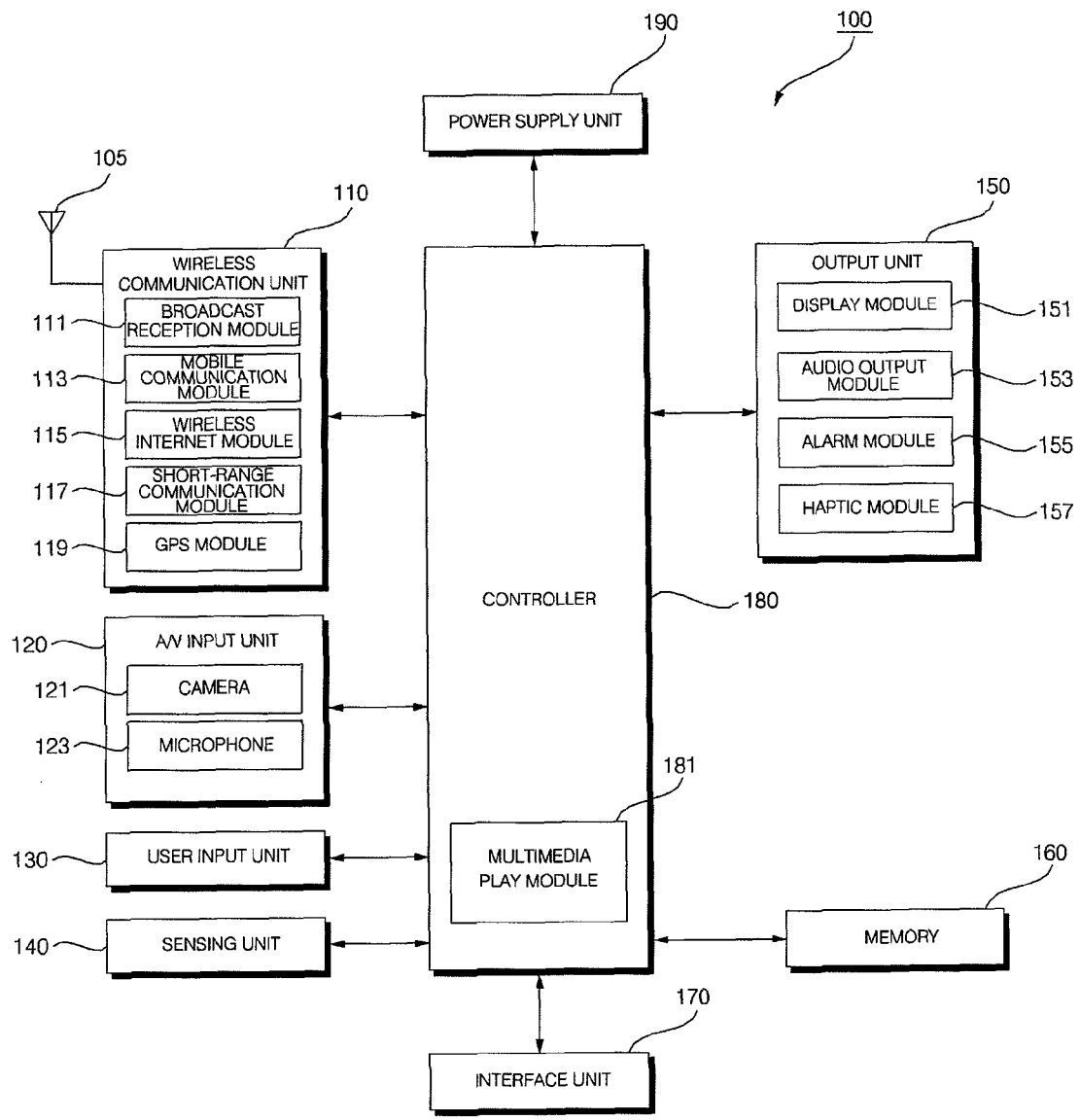
FIG. 1 illustrates a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless internet module 115, a short-range communication module 117, and a global positioning system (GPS) module 119.

The broadcast reception module 111 may receive a broadcast signal and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms. For example, the broadcast-related information may be electronic program guide (EPG) of digital multimedia broadcasting (DMB) or may be electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein. The broadcast signal and/or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may use various wireless internet techniques such as wireless fidelity (WiFi), wireless broadband (Wibro), world interoperability for microwave access (Wimax) or high-speed downlink Packet Access (HSDPA).

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera 121 and a microphone 123. The camera 121 may process various image frames such as still images or moving images captured by an image sensor during a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, a touch pad (static pressure/static voltage), a jog wheel, or a jog switch. In particular, if the user input unit 130 is implemented as a touch pad and forms a layer structure together with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The sensing unit 140 may include a proximity sensor (not shown), a pressure sensor (not shown), and an acceleration sensor (not shown). The proximity sensor may determine whether there is an entity nearby and approaching the mobile terminal 100 without any mechanical contact with the entity. More specifically, the proximity sensor may detect an entity that is nearby and approaching by detecting a change in an alternating magnetic field or the rate of change of static capacitance. The sensing unit 140 may include two or more proximity sensors.

The pressure sensor may determine whether pressure is being applied to the mobile terminal 100 and may detect the magnitude of pressure applied to the mobile terminal 100. The pressure sensor may be installed in a portion of the mobile terminal 100 in which the detection of pressure is necessary. For example, the pressure sensor may be installed in the display module 151. In this case, the display module 151 may differentiate a typical touch input from a pressure touch input, which is generated by applying greater pressure than that used to generate a typical touch input, based on a signal output by the pressure sensor. In addition, it is possible to determine the magnitude of pressure applied to the display module 151 upon receiving a pressure touch input based on the signal output by the pressure sensor.

Acceleration sensors are a type of device for converting an acceleration variation into an electric signal. With recent developments in micro-electromechanical system (MEMS) technology, acceleration sensors have been widely used in various products for various purposes. For example, an acceleration sensor may be installed in an airbag system for an automobile and may thus be used to detect collisions. Alternatively, an acceleration sensor may be used as an input device for a computer game and may sense the motion of the human hand during a computer game. Two or three acceleration sensors representing different axial directions may be installed in the mobile terminal 100. Alternatively, only one acceleration sensor representing a Z axis may be installed in the mobile terminal 100.

The sensing unit 140 may include at least one of a motion sensor, a pressure sensor, a temperature sensor, a tension sensor, a current sensor, a tactile sensor, and a tilt sensor and may thus be able to determine whether the display module 151, e.g., a flexible display, is bent or folded and what part of the flexible display is bent or folded.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a layer structure together and are thus implemented as a touch screen, the display module 151 may be used as both an output device and an input device. If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is detected, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties. E-paper may be implemented on any type of substrate such as a plastic, metallic or paper substrate and may maintain an image displayed thereon even when power is cut off. In addition, e-paper may be able to reduce the power consumption of the mobile terminal 100 because it does not require a backlight assembly. The display module 151 may be implemented as e-paper by using electrostatic-charged hemispherical twist balls, using electrophoretic deposition, or using microcapsules.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output a signal upon receiving a call signal or a message. In addition, the alarm module 155 may receive a key signal and may output a signal as feedback to the key signal. Therefore, the user may be able to determine whether an event has occurred based on an alarm signal output by the alarm module 155. An alarm signal for alerting the user to the occurrence of an event may be output not only by the alarm module 155 but also by the display module 151 or the audio output module 153.

The haptic module 157 may provide various haptic effects (such as vibrations) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may receive data from an external device or may be powered by an external device. The interface unit 170 may transmit data provided by an external device to other components in the mobile terminal 100 or may transmit data provided by other components in the mobile terminal 100 to an external device. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone.

If the mobile terminal 100 is connected to an external cradle, power may be supplied from the external cradle to the mobile terminal through the interface unit 170, and various command signals may be transmitted from the external cradle to the mobile terminal through the interface unit 170.

The controller 180 may control the general operation of the mobile terminal 100. For example, the controller 180 may perform various control operations regarding making/receiving a voice call, transmitting/receiving data, or making/receiving a video call. The controller 180 may include a multimedia play module 181, which plays multimedia data. The multimedia play module 181 may be implemented as a hardware device and may be installed in the controller 180. Alternatively, the multimedia play module 181 may be implemented as a software program.

The power supply unit 190 may be supplied with power by an external power source or an internal power source and may supply power to the other components in the mobile terminal 100.

The mobile terminal 100 may include a wired/wireless communication system and a satellite-based communication system. The mobile terminal 100 may be configured to be able to operate in a communication system transmitting data as frames or packets.

The exterior of the mobile terminal 100 will hereinafter be described in detail with reference to FIGS. 2 through 4. For convenience, assume that the mobile terminal 100 is a bar-type mobile terminal equipped with a touch screen and a flexible display. However, the present invention is not restricted to a bar-type mobile terminal. Rather, the present invention can be applied to various mobile phones, other than a bar-type mobile terminal.

Figure 2:
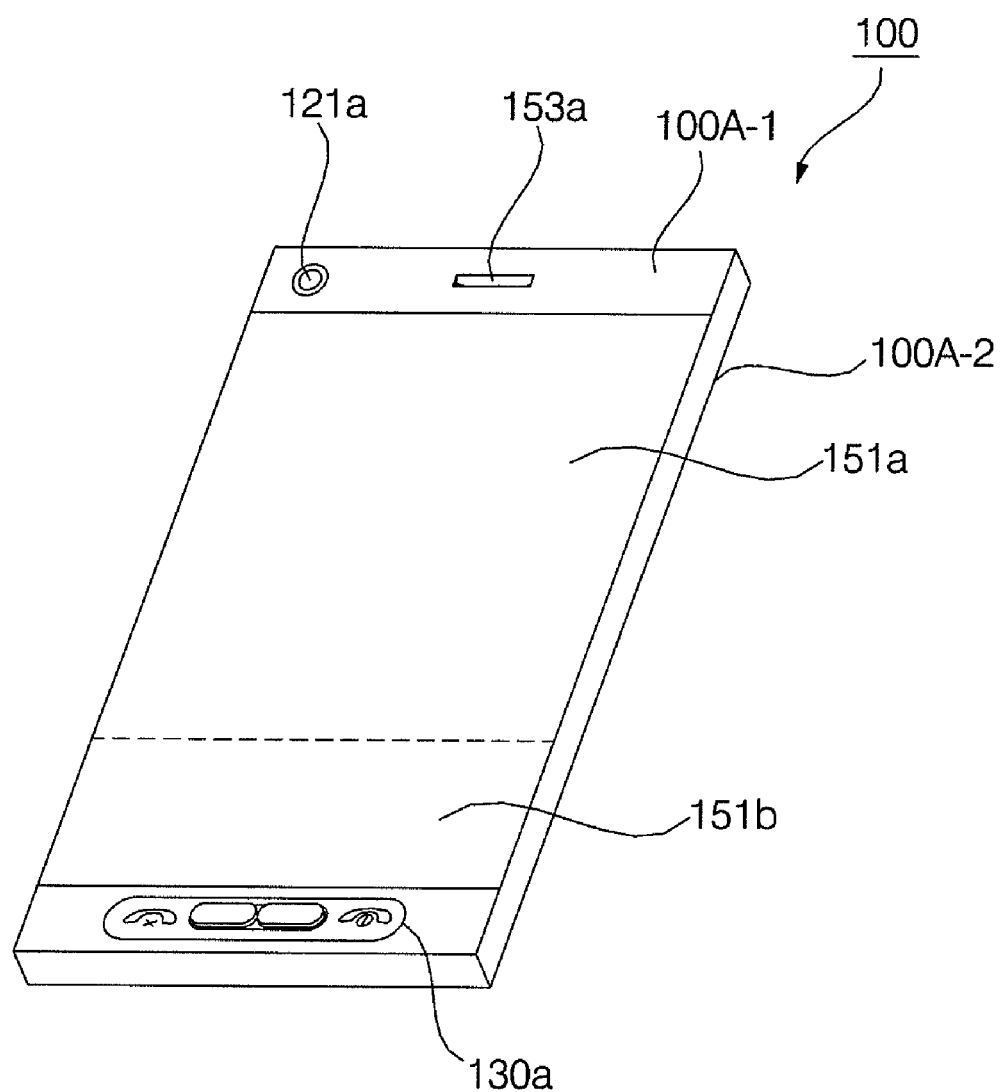
FIGS. 2 and 3 illustrate front perspective views of the mobile terminal shown in FIG. 1.
Figure 3:
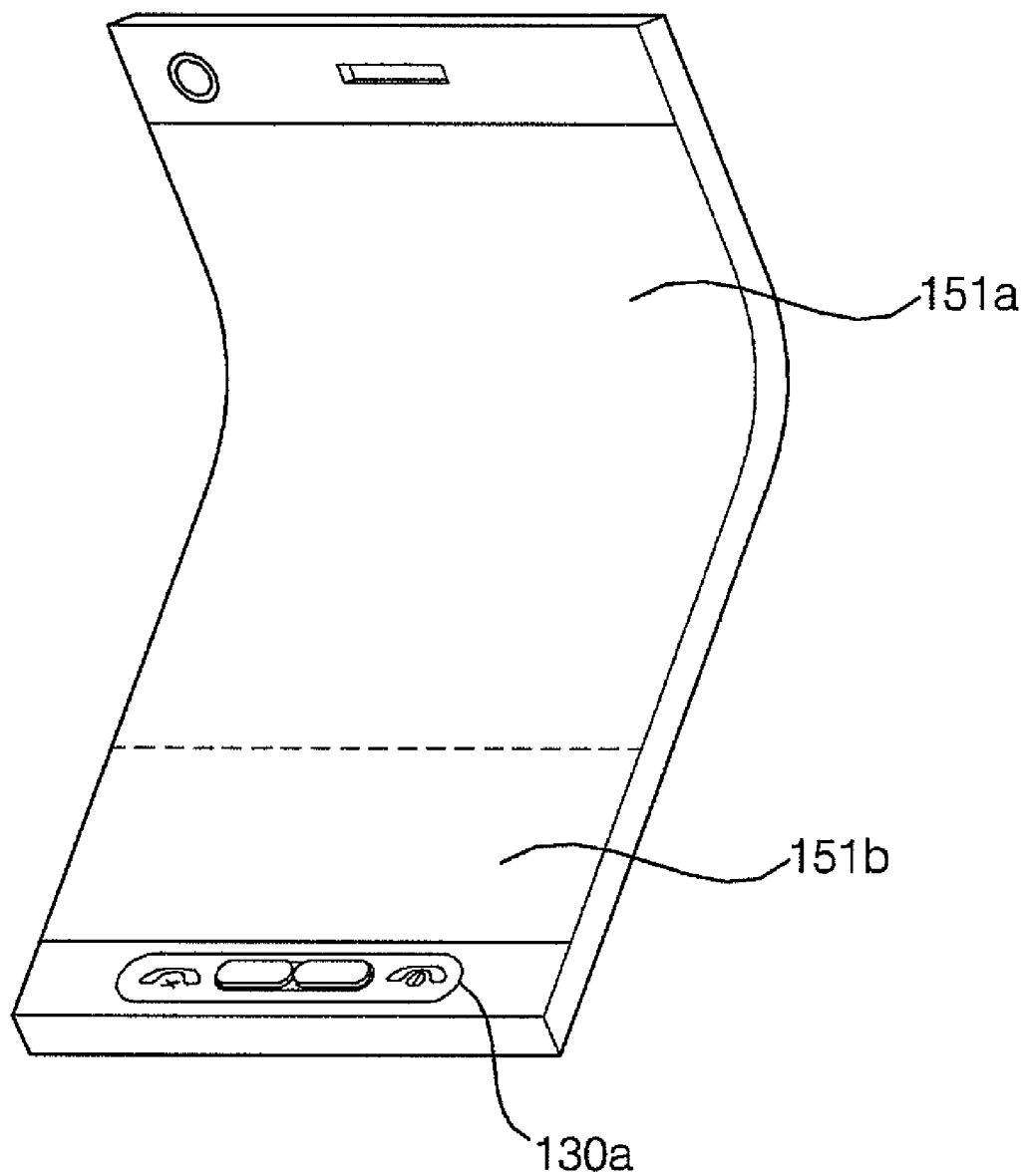

FIG. 2 illustrates a front perspective view of the mobile terminal 100 shown in FIG. 1. Referring to FIG. 2, the exterior of the first body 100A may be defined by a front case 100A-1 and a rear case 100A-2. Various electronic devices may be installed in the space formed by the front case 100A-1 and the rear case 100A-2. At least one intermediate case may be additionally provided between the front case 100A-1 and the rear case 100A-2. The front case 100A-1 and the rear case 100A-2 may be formed of a synthetic resin through injection molding. Alternatively, the front case 100A-1 and the rear case 100A-2 may be formed of a metal such as stainless steel (STS) or titanium (Ti).

A first display module 151a, a second display module 151b, a first audio output module 153a, a first camera 121a and a first user input unit 130a may be disposed in the front case 100A-1.

The first and second display modules 151a and 151b may visualize various information. The first display module 151a may be a flexible display. A touch pad may be configured to overlap the second display module 151b and thus to form a layer structure. In this case, the second display module 151b may serve as a touch screen and may thus allow the user to input various information to the mobile terminal 100 simply by touching the second display module 151b.

The user input unit 130 may adopt various manipulation methods as long as it can offer tactile feedback to the user.

For example, the first user input unit 130a may allow the user to input various operating commands such as 'start', 'end', and 'scroll' or may be used as a hot key for activating certain functions of the mobile terminal 100.

The microphone 123 may be configured to properly receive the voice of the user or other sounds.

A flexible display may be used as the first display module 151a. In this case, referring to FIG. 3, the first display module 151a may be bent or folded. Once bent or folded, the first display module 151a may be continuously maintained to be bent or folded. Alternatively, the first display module 151a may be flexible enough to return to its original state regardless of whether being bent or folded.

Figure 4:
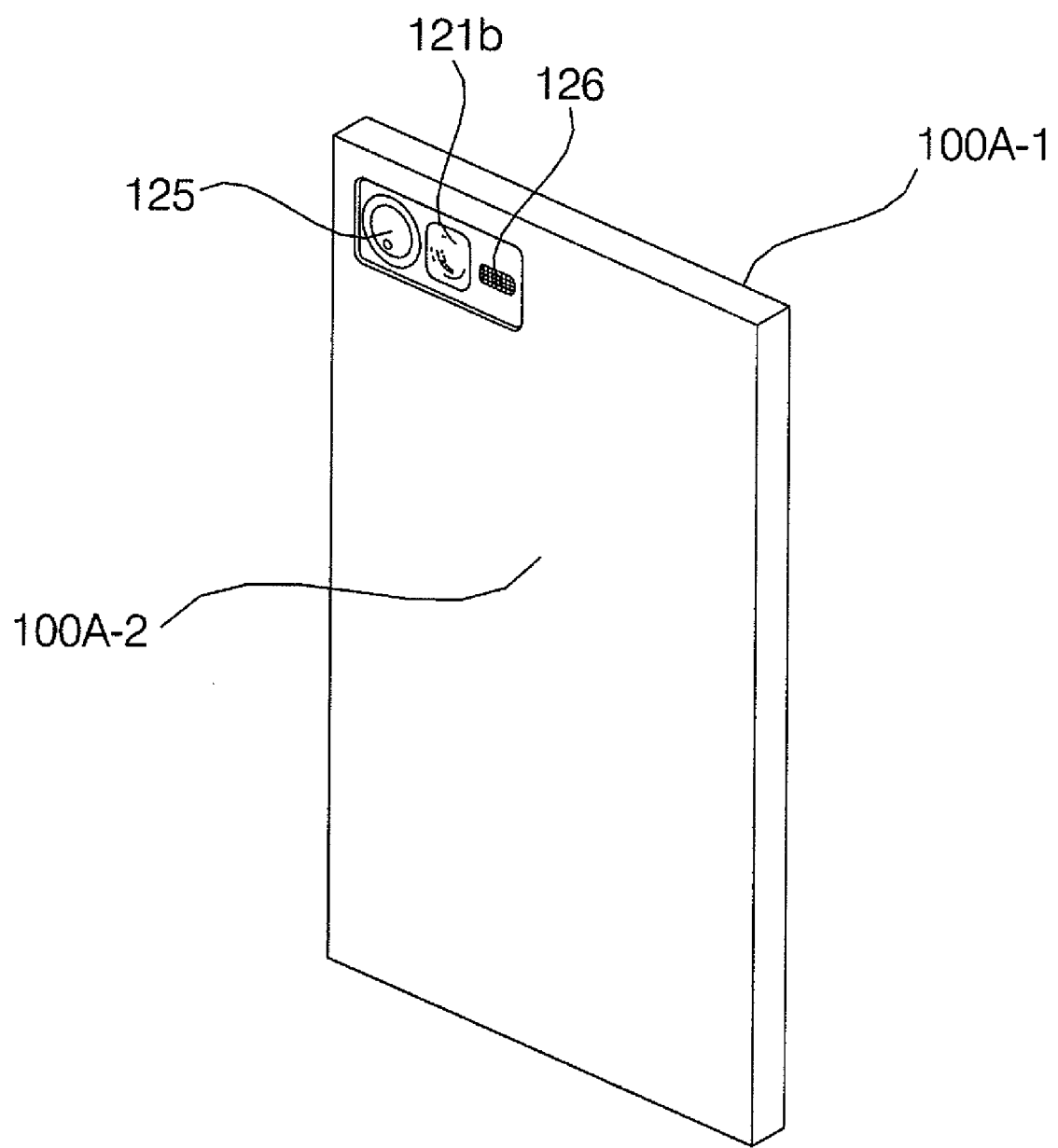
FIG. 4 illustrates a rear perspective view of the mobile terminal shown in FIG. 2.

FIG. 4 illustrates a rear perspective view of the mobile terminal 100 shown in FIG. 2. Referring to FIG. 4, the interface unit 170 may be disposed in the rear case 100A-2. A second camera 121b may be disposed at the rear of the rear case 100A-2 of the second body 100B.

The second camera 121b may have a different photographing direction from that of the first camera 121a shown in FIG. 2. In addition, the first and second cameras 121a and 121b may have different resolutions. For example, the first camera 121a may be used to capture and then transmit an image of the face of the user during a video call, and thus, a low-resolution camera may be used as the first camera 121a. The second camera 121b may be used to capture an image of an ordinary subject. Since images captured by the second camera 121b generally do not need to be transmitted, a high-resolution camera may be used as the second camera 121b.

A mirror 125 and a camera flash 126 may be disposed near the second camera 121b. The camera flash 126 may illuminate a subject when the second camera 121b captures an image of the subject. The user may look in the mirror 125 and prepare himself or herself for taking a self shot.

A second audio output module (not shown) may be additionally provided in the rear case 100A-2. The second audio output module may realize a stereo function along with the first audio output module 153a. The second audio output module may also be used during a speaker-phone mode.

An antenna (not shown) for receiving a broadcast signal may be disposed on one side of the rear case 100A-2. The antenna may be installed so as to be able to be pulled out of the rear case 100A-2. The power supply unit 190 may be disposed in the rear case 100A-2. The power supply unit 190 may be a rechargeable battery and may be coupled to the rear case 100A-2 so as to be attachable to or detachable from the rear case 100A-2.

The second camera 121b is illustrated in FIG. 4 as being provided on the rear case 100A-2, but the present invention is not restricted to this. In addition, the first camera 121a may be configured to be rotatable and thus to cover the photographing direction of the second camera 121b. In this case, the second camera 121b may be optional.

Figure 5:
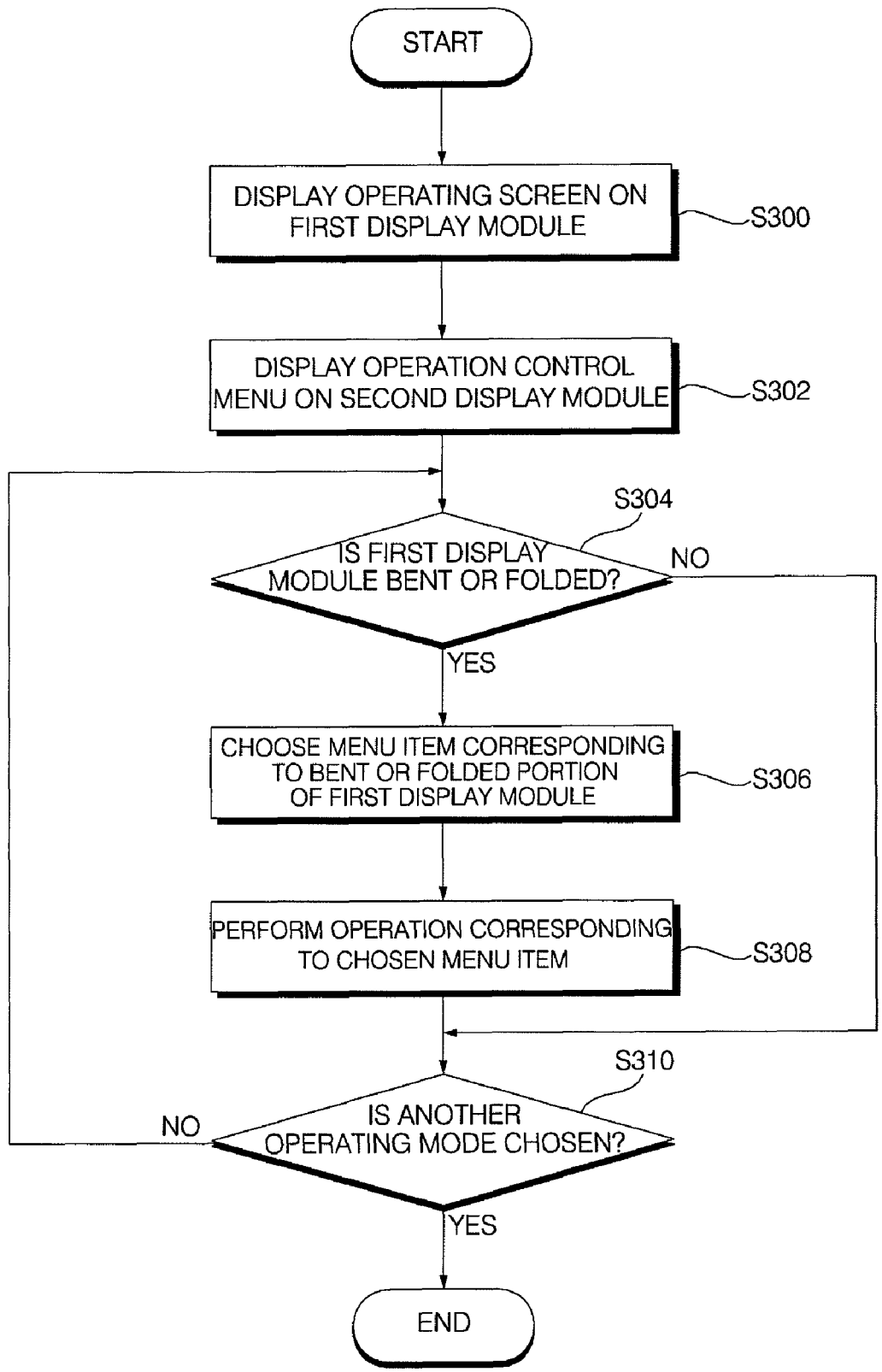
FIG. 5 illustrates a flowchart of a method of controlling a mobile terminal according to a first exemplary embodiment of the present invention.

FIG. 5 illustrates a flowchart of a method of controlling a mobile terminal according to a first exemplary embodiment of the present invention. Referring to FIG. 5, the controller 180 may display an operating screen corresponding to an operating mode chosen by the user on the first display module 151a, which is flexible (S300). Thereafter, the controller 180 may display an operation control menu on the second display module 151b, which can receive a touch input (S302).

The operating screen displayed on the first display module 151a may be an idle screen, an image viewer screen, a broadcast screen, a map screen and a web page screen. The operation control menu displayed on the second display module 151b may include a plurality of menu items for controlling the operating screen displayed on the first display module 151a or a plurality of menu items that can be executed. The menu items of the operation control menu displayed on the second display module 151b may be displayed as icons.

Thereafter, the controller 180 may determine whether the first display module 151a is bent (S304). More specifically, the controller 180 may determine whether the first display module 151a is bent and what part of the first display module 151a is bent based on a signal output by the sensing unit 140.

If the first display module 151a is determined to be bent or folded, the controller 180 may control a menu item corresponding to a bent or folded portion of the first display module 151a to be chosen (S306). The chosen menu item may be displayed so as to be easily distinguishable from other menu items. In addition, a haptic effect corresponding to the chosen menu item may be generated.

The controller 180 may control an operation corresponding to the chosen menu item to be performed (S308). The controller 180 may display an inquiry message to the user and may thus decide whether to perform the operation corresponding to the chosen menu item according to the user's reply to the inquiry message. Alternatively, only if the chosen menu item is chosen again by being touched, the controller 180 may control the operation corresponding to the chosen menu item to be performed.

Operations S304 through S308 may be repeatedly performed until the user chooses another operating mode (S310).

In this manner, it is possible to choose and execute one of a plurality of menu items displayed on the second display module 151b according to whether the first display module 151a is bent or folded.

Figure 6:
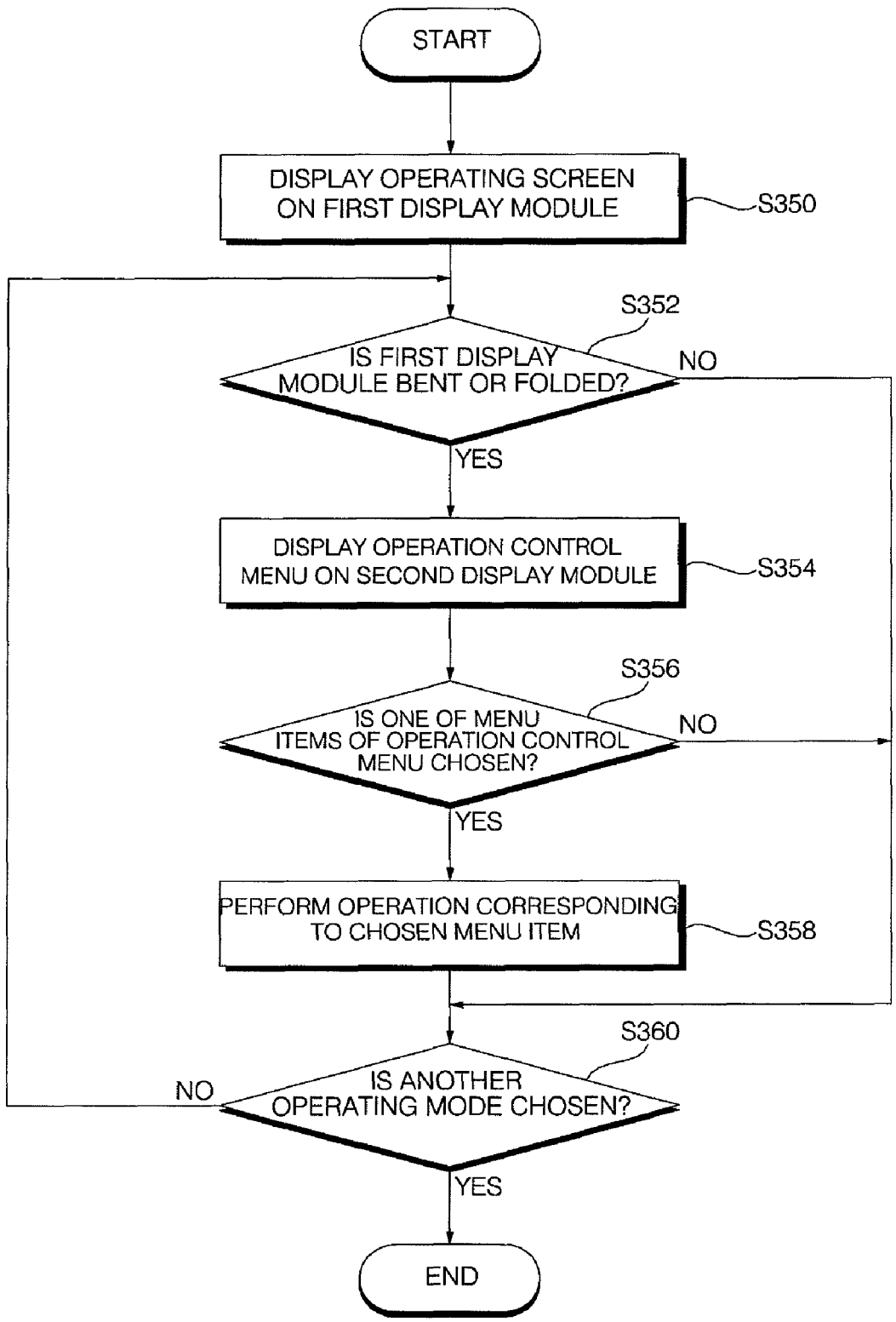
FIG. 6 illustrates a flowchart of a method of controlling a mobile terminal according to a second exemplary embodiment of the present invention.

FIG. 6 illustrates a flowchart of a method of controlling a mobile terminal according to a second exemplary embodiment of the present invention. Referring to FIG. 6, the controller 180 may display an operating screen corresponding to an operating mode chosen by the user on the first display module 151a, which is flexible (S352).

Thereafter, the controller 180 may determine whether the first display module 151a is bent or folded (S352). If the first display module 151a is determined to be bent or folded, the controller 180 may display an operation control menu, including a plurality of menu items that can be executed in the chosen operating mode, on the second display module 151b (S354).

If one of the menu items displayed on the second display module 151b is chosen in response to a touch input (S356), the controller 180 may control an operation corresponding to the chosen menu item to be performed (S358).

Operations S352 through S358 may be repeatedly performed until the user chooses another operating mode (S360).

In this manner, it is possible to display an operation control menu on the second display module 151b and execute the operation control menu according to whether the first display module 151a is bent or folded.

Figure 7:
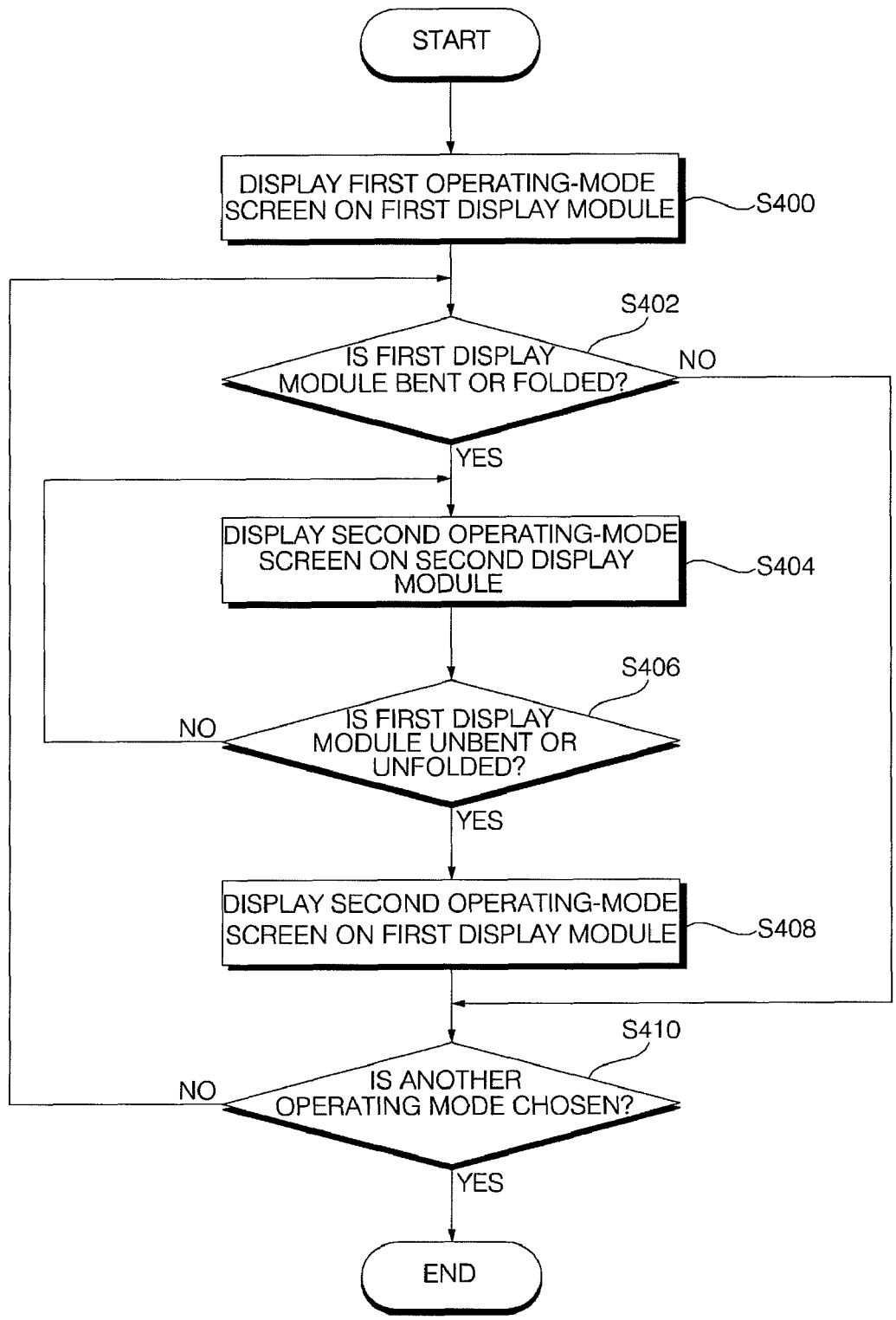
FIG. 7 illustrates a flowchart of a method of controlling a mobile terminal according to a third exemplary embodiment of the present invention.

FIG. 7 illustrates a flowchart of a method of controlling a mobile terminal according to a third exemplary embodiment of the present invention. Referring to FIG. 7, the controller 180 may display a first operating-mode screen corresponding to an operating mode chosen by the user on the first display module 151a (S400).

The controller 180 may determine whether the first display module 151a is bent or folded (S402). If the first display module 151a is determined to be bent or folded, the controller 180 may display a second operating-mode screen on the second display module 151b. The second operating-mode screen may be a sub-menu screen of the first operating-mode screen or may be an operating-mode screen that can be displayed, replacing the first operating-mode screen.

If the first display module 151a returns to its original state (S406), the controller 180 may display the second operating-mode screen on the first display module 151a, and may display a third operating-mode screen related to the second operating-mode screen on the second display module 151b.

Operations S402 through S408 may be repeatedly performed until the user chooses another operating mode (S410).

In this manner, it is possible to quickly switch from one operating-mode screen to another operating-mode screen according to whether the first display module 151a is bent or folded.

Figure 8:
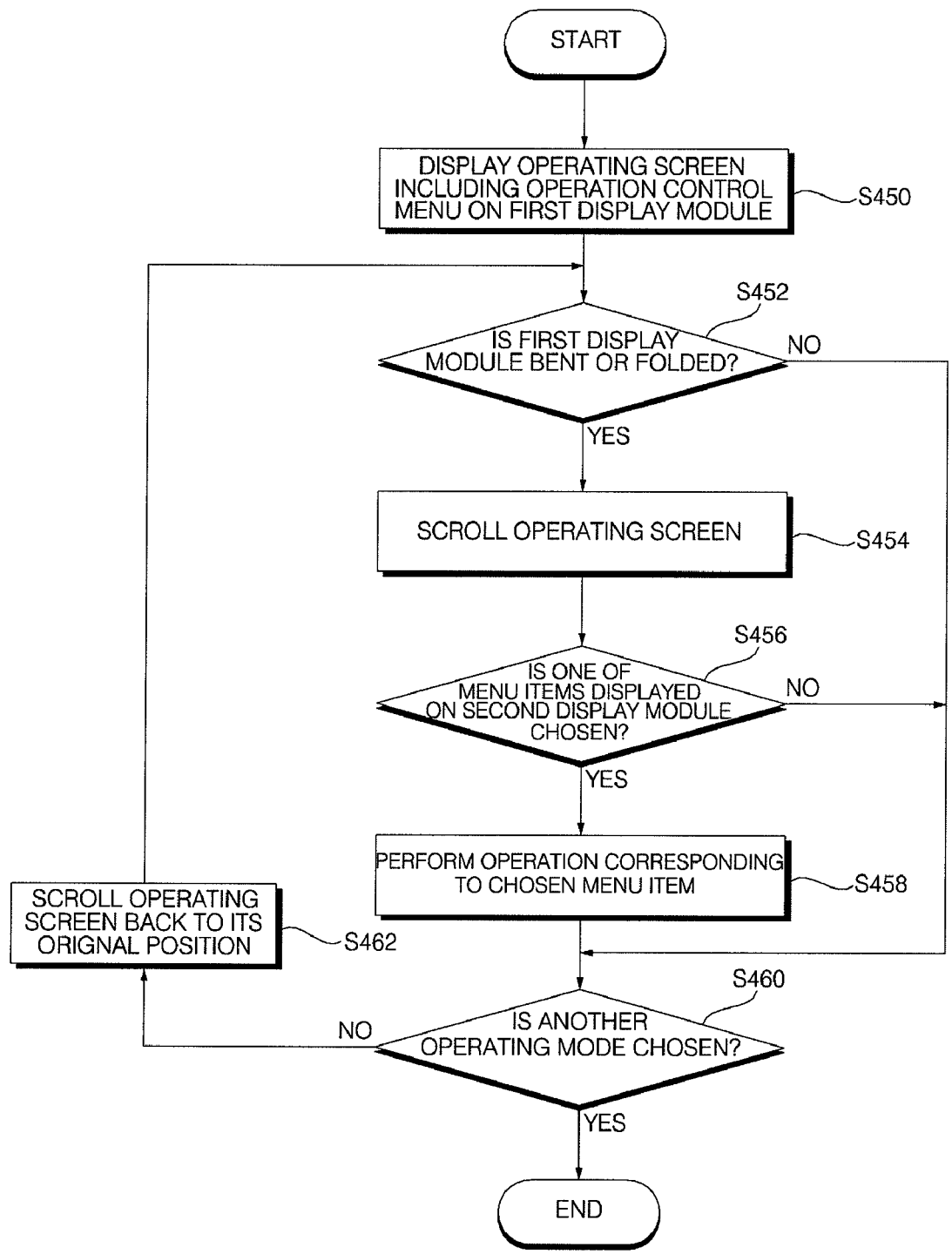
FIG. 8 illustrates a flowchart of a method of controlling a mobile terminal according to a fourth exemplary embodiment of the present invention.

FIG. 8 illustrates a flowchart of a method of controlling a mobile terminal according to a fourth exemplary embodiment of the present invention. In the fourth exemplary embodiment, the mobile terminal 100 may operate in an integrated-operating mode in which the first and second display modules 151a and 151b act as a single display.

Referring to FIG. 8, the controller 180 may display an operating-mode screen corresponding to a menu or operation chosen by the user and including an operation control menu on the first and second display modules 151a and 151b (S450).

Thereafter, the controller 180 may determine whether the first display module 151a is bent or folded (S452). If the first display module 151a is determined to be bent or folded, the controller 180 may control the operating-mode screen to be scrolled (S454).

More specifically, if a touch input and then a drag input are received through the second display module 151b, the controller 180 may scroll the operating-mode screen in a direction corresponding to the drag input.

If the operating-mode screen is scrolled to the extent that the operation control menu can be displayed on the second display module 151b and if one of a plurality of menu items of the operation control menu is chosen by being touched (S456), the controller 180 may control an operation corresponding to the chosen menu item to be performed (S458).

Operations S452 through S458 may be repeatedly performed until the user chooses another operating mode (S460).

In this manner, it is possible to easily move an operation control menu from the first display module 151a to the second display module 151b, which can receive a touch input, according to whether the first display module 151a is bent or folded and thus to efficiently choose one of a plurality of menu items of the operation control menu.

FIGS. 9 through 17 illustrate diagrams for explaining the methods of the first through fourth exemplary embodiments.

Figure 9:
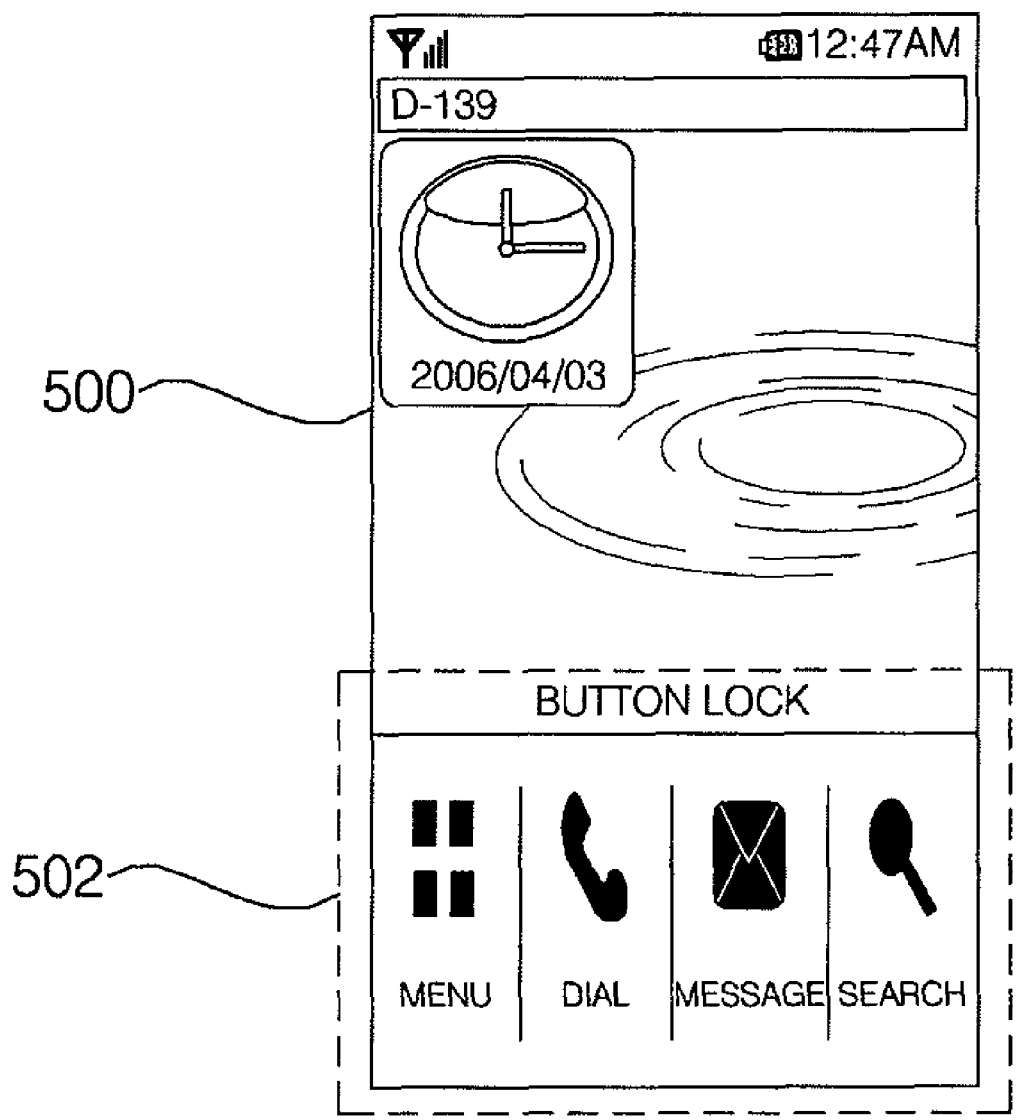
FIG. 9 illustrates a diagram for explaining a separate-operating mode.

More specifically, FIG. 9 illustrates a diagram for explaining a separate-operating mode in which the first and second display modules 151a and 151b are driven independently. Referring to FIG. 9, an operating-mode screen may be displayed on the first display module 151a, and an operation control menu 502 may be displayed on the second display module 151b. In this case, various operations may be performed according to whether the first display module 151a is bent or folded.

Figure 10:
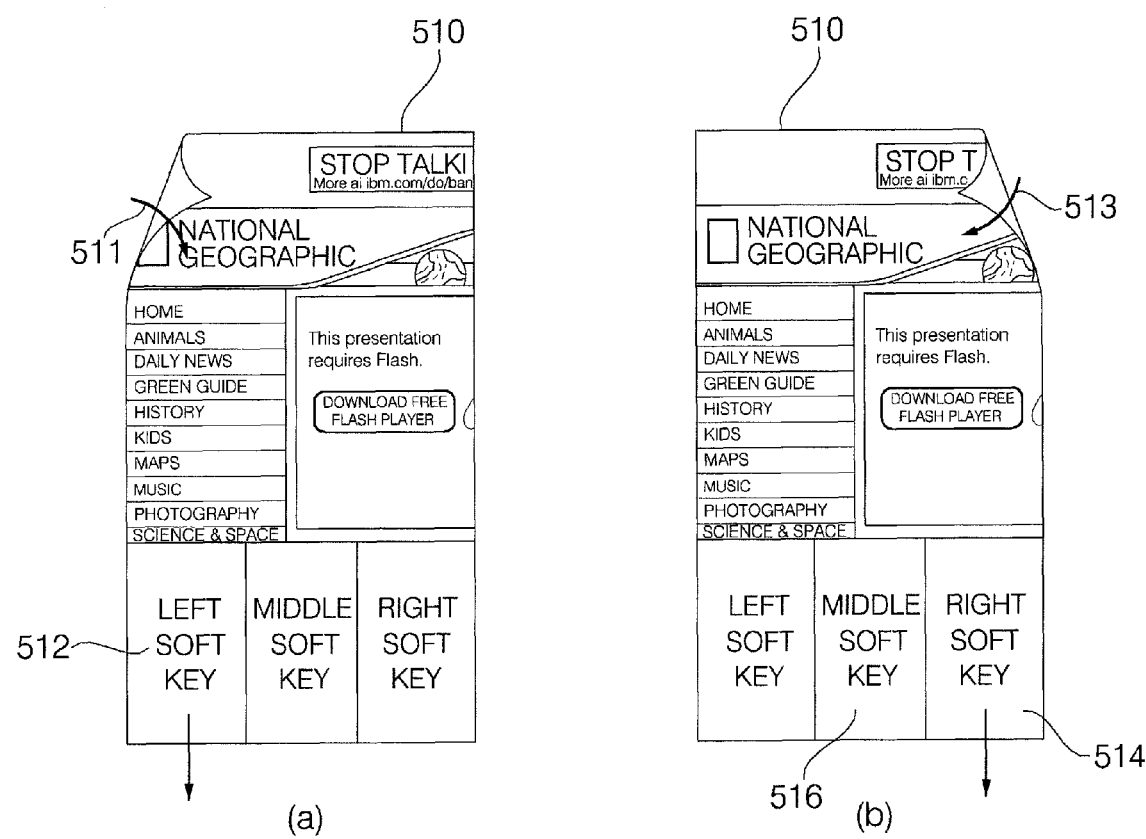
FIGS. 10 and 11 illustrate diagrams showing how to execute an operation control menu.
Figure 11:
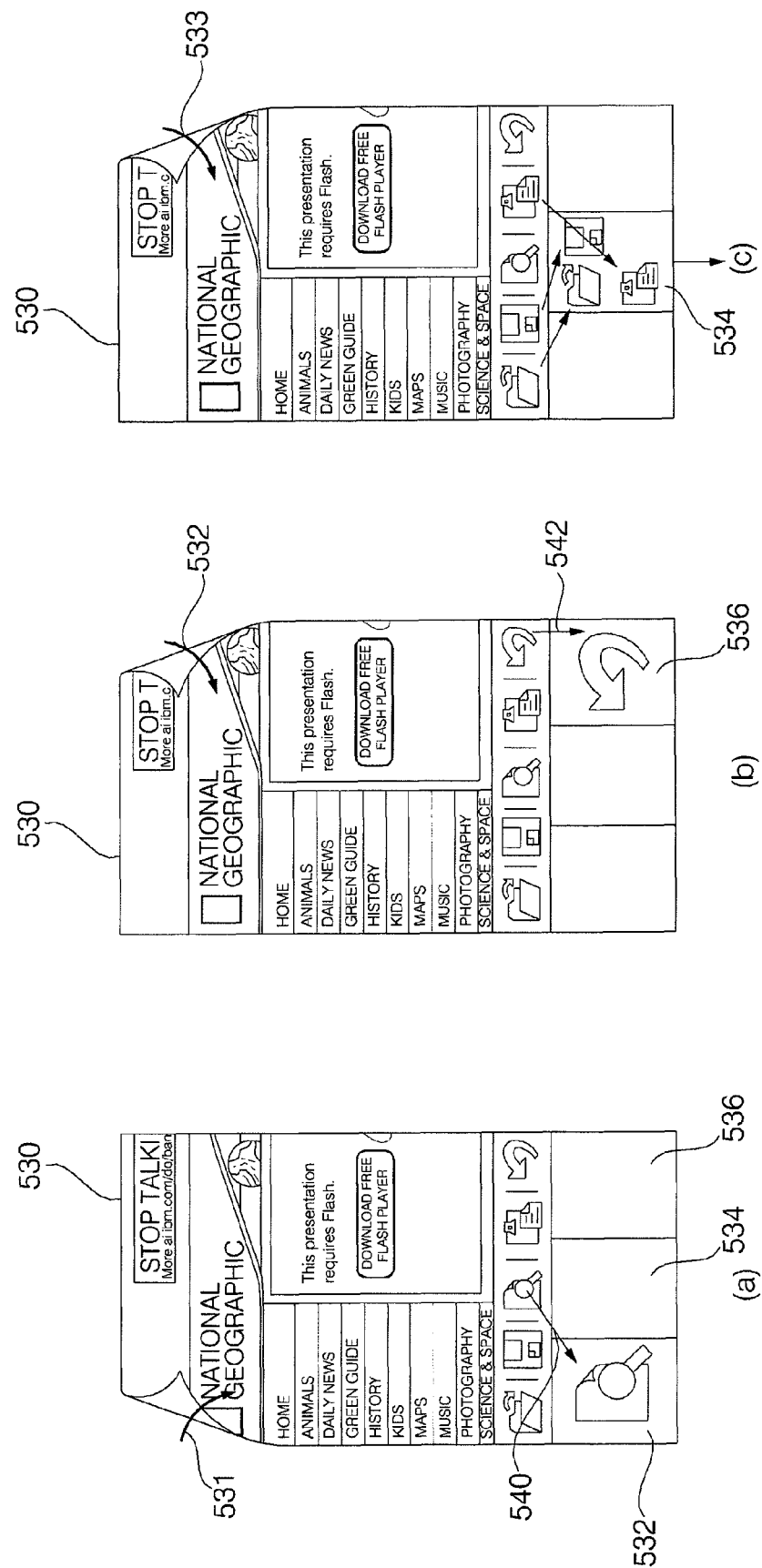

FIGS. 10 and 11 illustrate diagrams showing how to choose and execute one of a plurality of menu items of an operation control menu displayed on the second display module 151b. Referring to FIG. 10(a), when the upper left corner of the first display module 151 is folded forward, as indicated by reference numeral 511, a menu item 512 displayed on the far left side of the second display module 151b may be chosen. Thereafter, the menu item 512 may be readily executed. Alternatively, the user may choose whether to execute the menu item 512.

Likewise, referring to FIG. 10(b), when the upper right corner of the first display module 151a is folded forward, as indicated by reference numeral 513, a menu item 514 displayed on the far right side of the second display module 151b may be chosen. A menu item 516 displayed in the middle of the second display module 151b may be chosen when the top of the first display module 151a is folded forward or backward.

Referring to FIG. 11(a), when the upper left corner of the first display module 151a is folded forward, as indicated by reference numeral 531, one of a plurality of executable menu items set in advance to be chosen in response to a touch-and-drag input 540, i.e., a menu item 532, may be executed. Referring to FIG. 11(b), when the upper right corner of the first display module 151a is folded forward, as indicated by reference numeral 532, one of the executable menu items set in advance to be chosen in response to a touch-and-drag input 542, i.e., a menu item 536, may be executed. Alternatively, referring to FIG. 11(c), two or more menu items may be set to be chosen at the same time when the first display module 151a is bent or folded. For this, a message asking the user to choose one of the executable menu items to be executed may be displayed.

Figure 12:
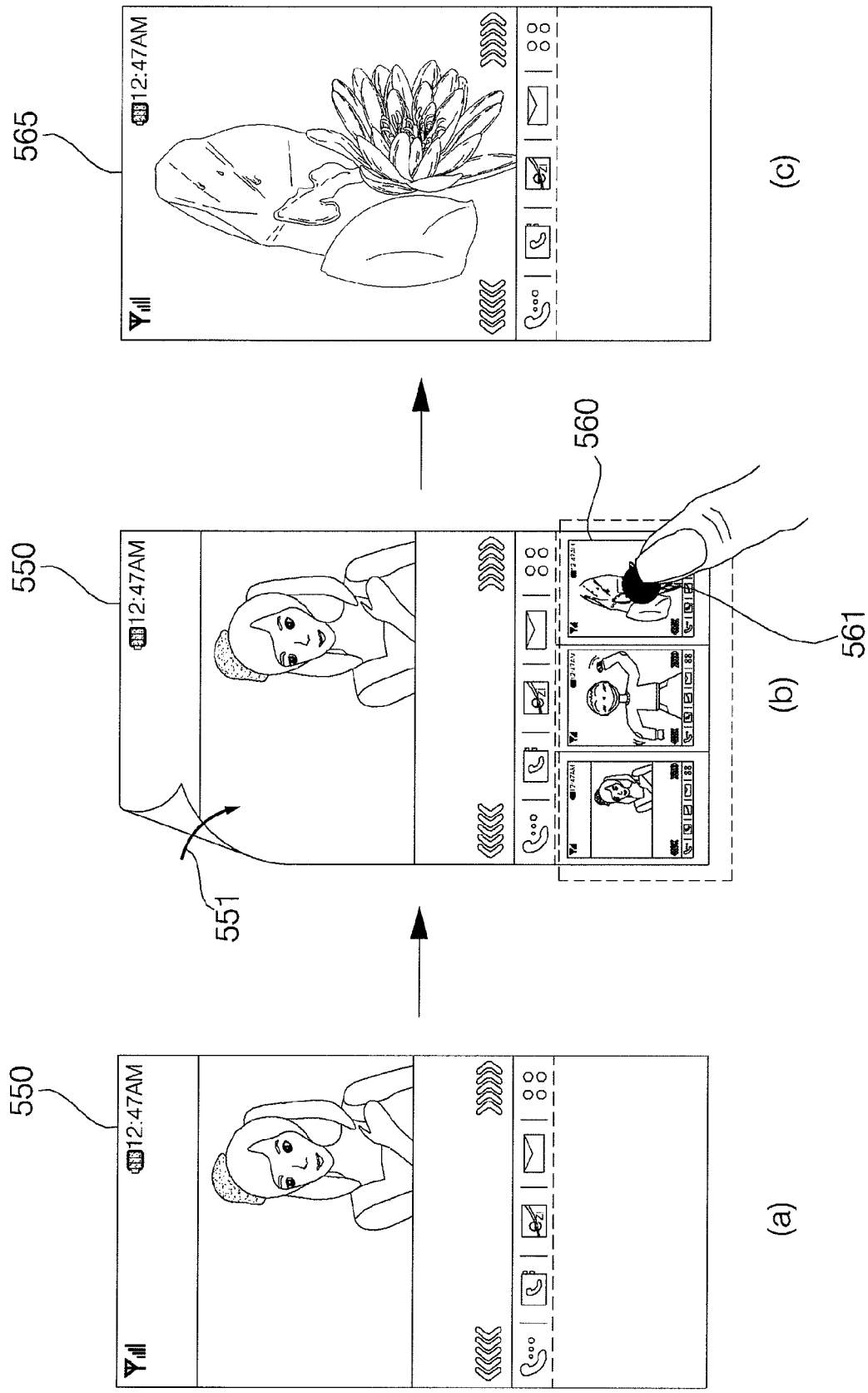
FIG. 12 illustrates diagrams showing how to display an operation control menu.

FIG. 12 illustrates diagrams showing how to display an operation control menu. Referring to FIG. 12(a), if the first display module 151a is folded, as indicated by reference numeral 551, when an operating-mode screen 550 is displayed on the first display module 151a, an operation control menu 561 including a plurality of executable menu items may be displayed on the second display module 151b. Referring to FIG. 12(b), if one of the executable menu items of the operation control menu 561, i.e., a menu item 560, is chosen in response to a touch input 561, an operation corresponding to the menu item 560 may be executed. As a result of the execution of the menu item 560, an operating-mode screen 565 may be displayed on the first display module 151a, as shown in FIG. 12(c).

Figure 13:
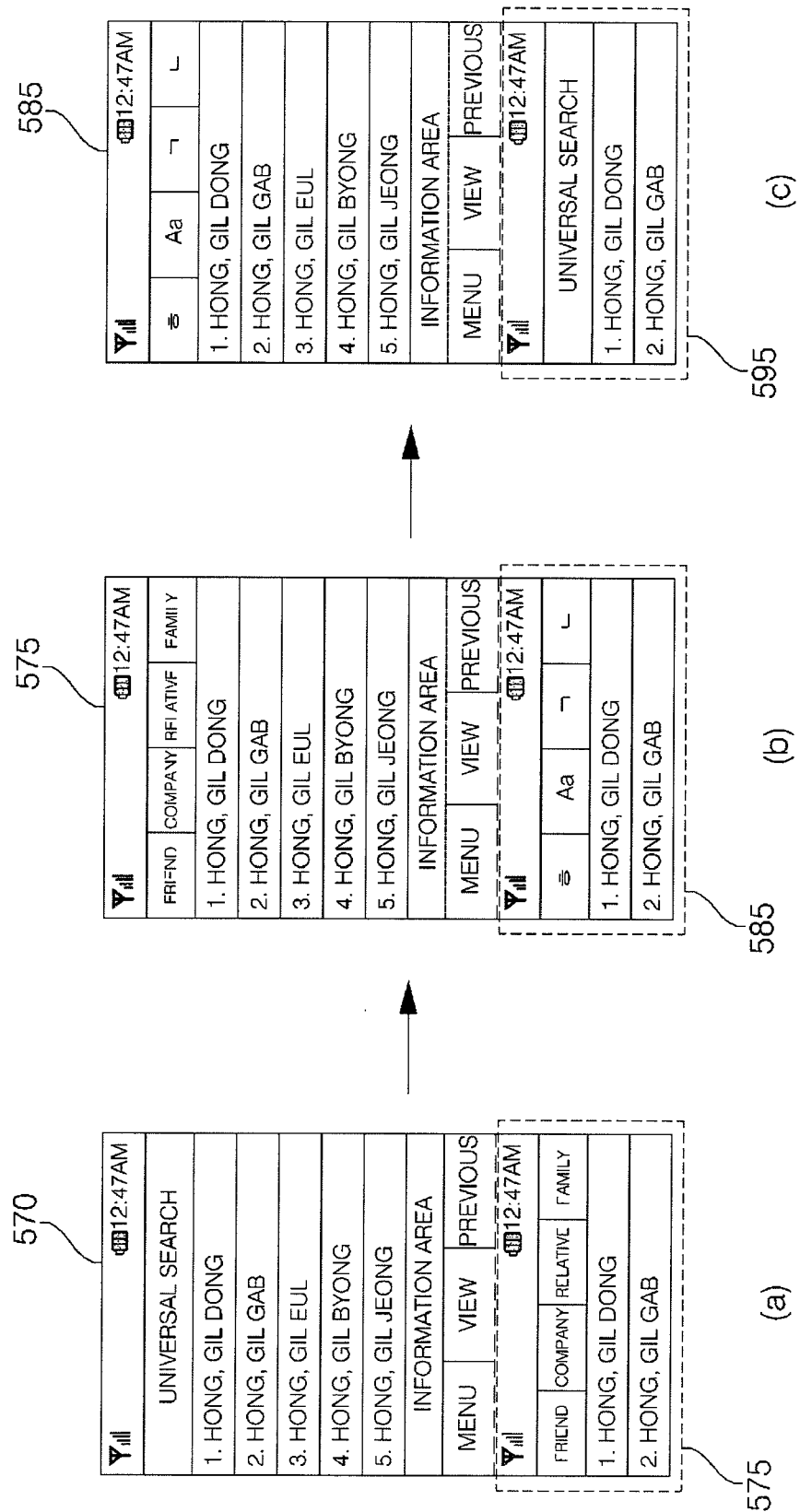
FIG. 13 illustrates diagrams showing how to switch from one operating-mode screen to another operating-mode screen.

FIG. 13 illustrates diagrams showing how to switch from one operating-mode screen to another operating-mode screen. Referring to FIG. 13(a), if the first display module 151a is folded when a first operating-mode screen 570 is displayed on the first display module 151a, a second operating-mode screen 575 may be displayed on the second display module 151b. Thereafter, referring to FIG. 13(b), if the first display module 151a is unfolded, the second operating-mode screen 575 may be displayed on the first display module 151a, and a third operating-mode screen 585 may be displayed on the second display module 151b.

Thereafter, referring to FIG. 13(c), if the first display module 151a is folded again and then unfolded, the third operating-mode screen 585 may be displayed on the first display module 151a, and a fourth operating-mode screen 595 may be displayed on the second display module 15 lb.

In this manner, it is possible to switch from one operating mode to another operating mode. For example, when a phonebook menu is chosen, it is possible to sequentially display a universal search screen, a group search screen, an alphabet search screen, a photo search screen and a universal search screen. In addition, it is possible to switch from an emoticon-input mode to a character-input mode.

Figure 14:
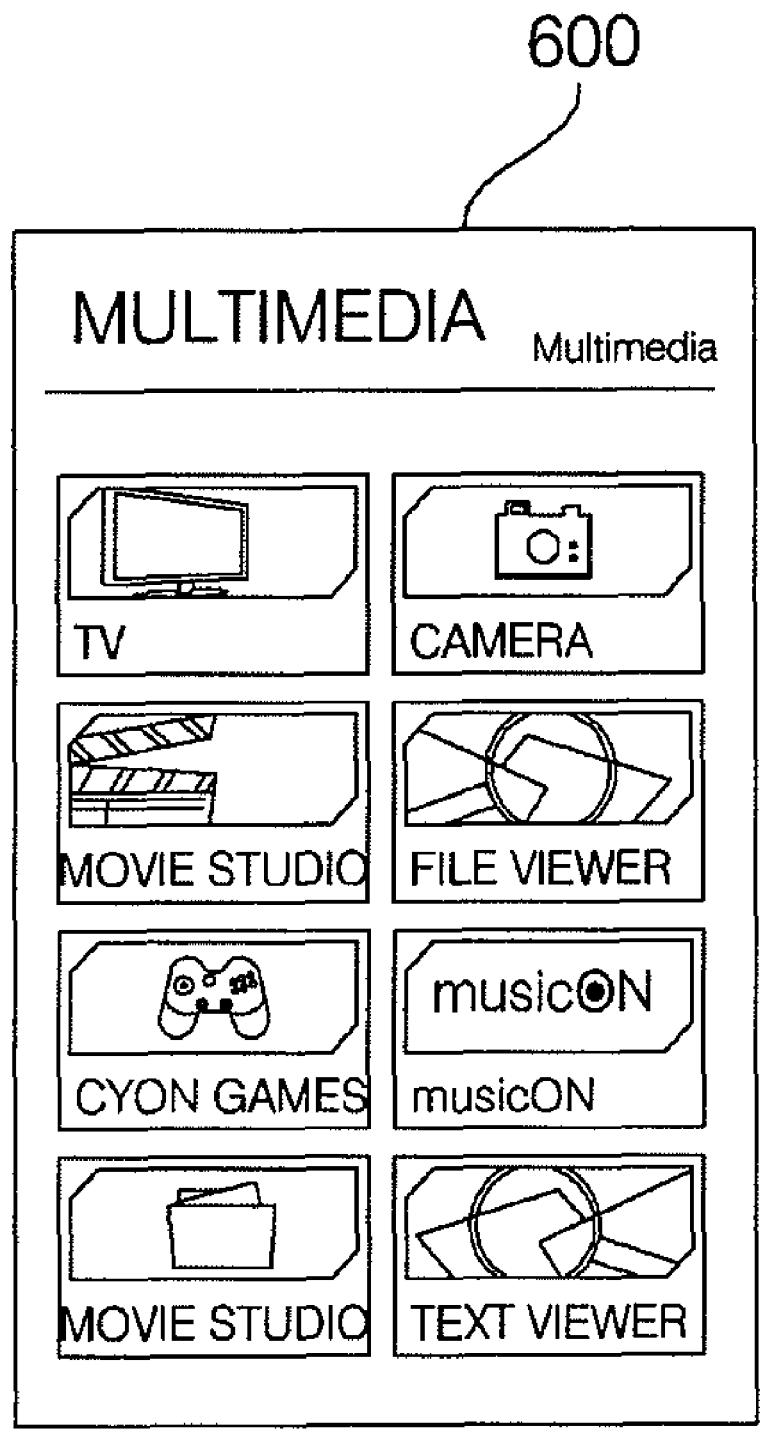
FIG. 14 illustrates a diagram for explaining an integrated-operating mode.

FIG. 14 illustrates a diagram for explaining an integrated-operating mode. In the integrated-operating mode, the first and second display modules 151a and 151b may operate as a single display module. Thus, in the integrated-operating mode, a plurality of menu items may be displayed on the first and second display modules 151a and 151b by treating first and second display modules 151a and 151b as a single display module, as shown in FIG. 14. Since the menu items displayed on the first display module 151a cannot be chosen by being touched, they need to be moved to the second display module 151b which can receive a touch input.

Figure 15:
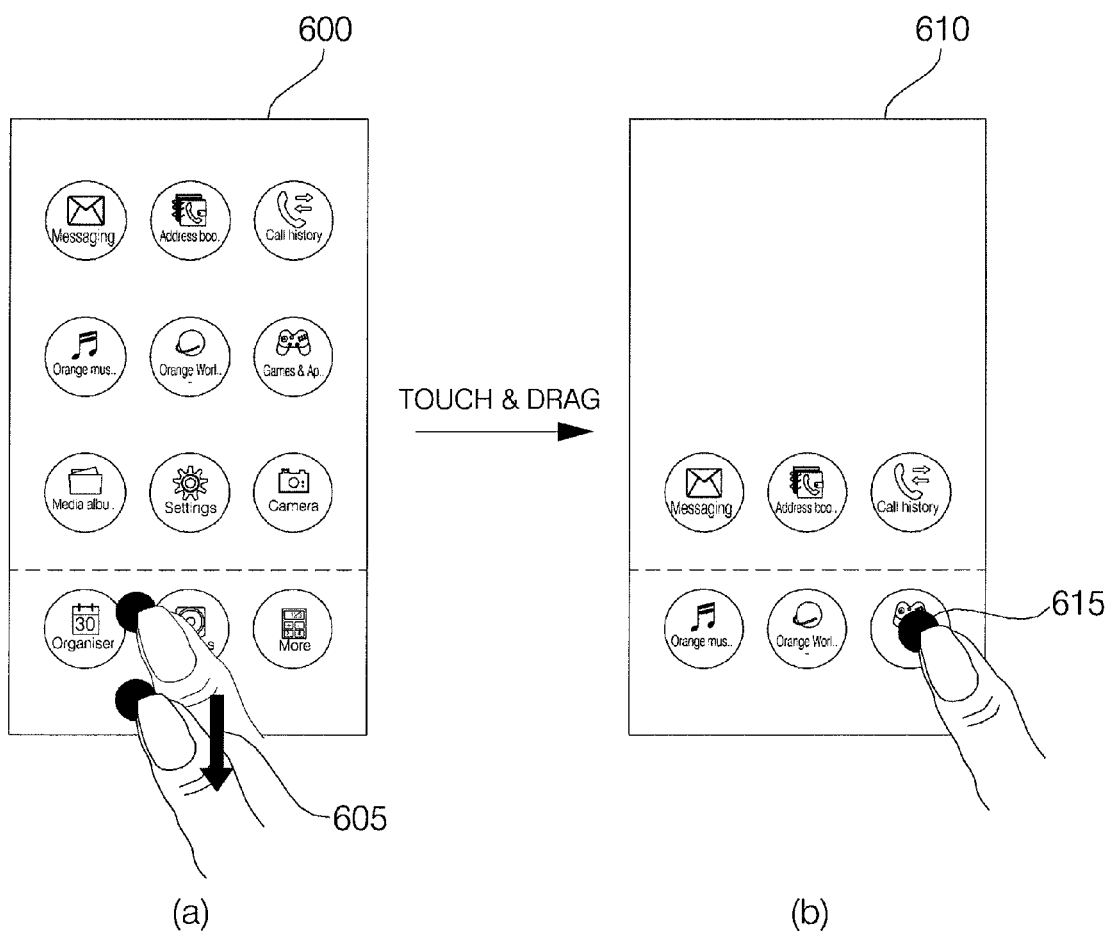
FIGS. 15 and 16 illustrate diagrams showing how to move and choose an operation control menu.
Figure 16:
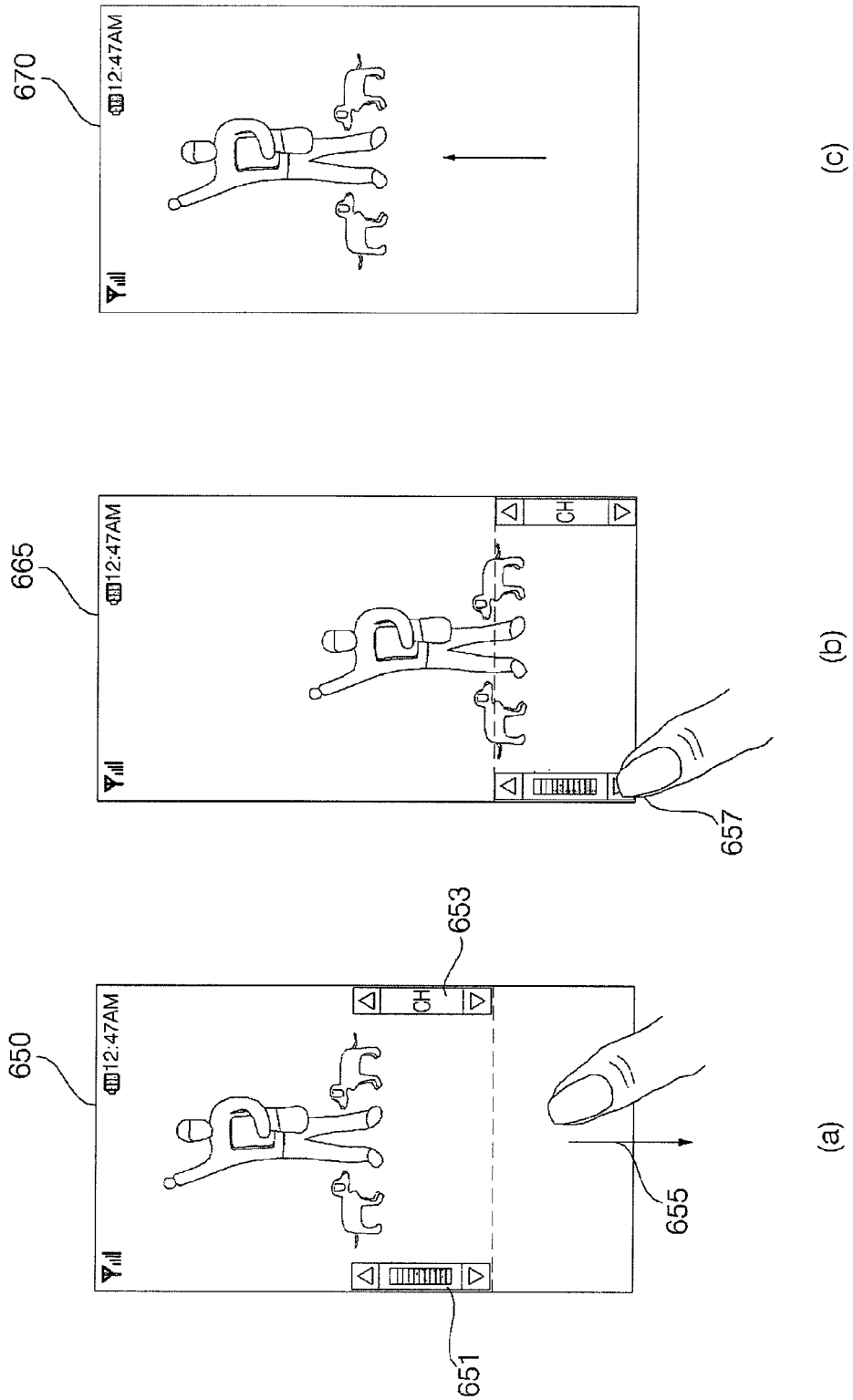

FIGS. 15 and 16 illustrate diagrams showing how to move a menu item displayed on the first display module 151a to the second display module 151b. Referring to FIGS. 15(a) and 15(b), if a touch-and-drag input 605 is detected from the second display module 151b, an operating screen 600 may be scrolled accordingly. If the operating screen 600 is scrolled to the extent that a menu item desired by the user can be displayed on the second display module 151b in operating screen 610, the desired menu item may be executed by being touched, as indicated by reference numeral 615.

Referring to FIGS. 16(a) and 16(b), if the first display module 151a is bent or folded or folded or a touch-and-drag input 655 is detected from the second display module 151b when an operating screen 650 including an operation control menu (651 and 653) is displayed on the first display module 151a, the operating screen 650 may be scrolled down and may thus be displayed on the second display module 151b. Then, the operation control menu (651 and 653) of the operating screen 665 may be executed in response to a touch input 657. Referring to FIGS. 16(c), if no operation is performed within a predetermined amount of time after scrolling down the operating screen 650, the operating screen 665 may be scrolled back up to its original position.

Figure 17:
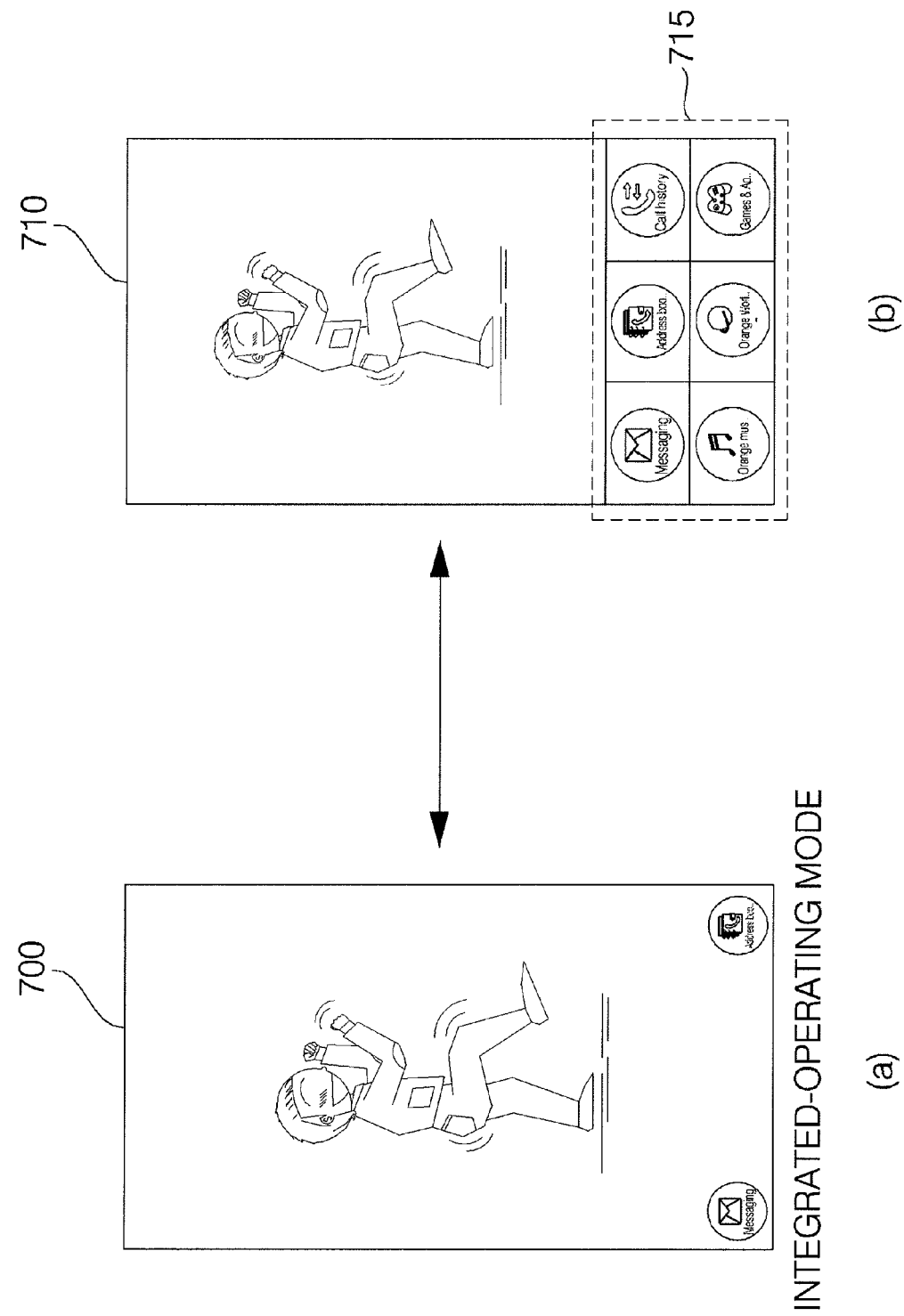
FIG. 17 illustrates diagrams showing how to switch between an integrated-operating mode and a separate-operating mode.

FIG. 17 illustrates diagrams showing how to switch from a separate-operating mode to an integrated-operating mode. Referring to FIGS. 17(a) and 17(b), if the first display module 151a is bent or folded during an integrated-operating mode 700, the mobile terminal 100 may be switched to a separate-operating mode 710. Likewise, if the first display module 151a is bent or folded during the separate-operating mode 710, the mobile terminal 100 may be switched to the integrated-operating mode 700.

As described above, it is possible to effectively control various operations performed by a mobile terminal according to whether a flexible first display module of the mobile terminal is bent or folded.

The mobile terminal according to the present invention and the method of controlling the mobile terminal according to the present invention are not restricted to the exemplary embodiments set forth herein. Therefore, variations and combinations of the exemplary embodiments set forth herein may fall within the scope of the present invention.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, it is possible to effectively control various operations performed by a mobile terminal according to whether a flexible display of the mobile terminal is bent or folded. Therefore, it is possible to facilitate the manipulation of a mobile terminal and thus to improve user convenience simply by bending or folding a flexible display, instead of using existing data input/output methods.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a mobile terminal equipped with a flexible first display module and a second display module capable of receiving a touch input, the method comprising:

displaying an operating screen on the first display module;

displaying an operation control menu including a plurality of menu items on the second display module, the operation control menu being a menu for controlling the operating screen;

determining, by the mobile terminal, which portion of the first display module is bent or folded while displaying the operating screen and the operating control menu;

choosing, by the mobile terminal, one of the plurality of menu items of the operation control menu corresponding to the determined bent or folded portion of the first display module; and performing, by the mobile terminal, an operation corresponding to the chosen menu item and applying a result of the performed operation to the operation screen of the first display module, wherein the first and second display modules are independently driven, the method further comprising switching an operation mode of the mobile terminal if a predetermined portion of the first display module is bent or folded, the operation mode comprising a separate-operating mode and an integrated-operating mode.

2. The method of claim 1, wherein the step of performing the operation comprises:

performing the operation corresponding to the chosen menu item after the one of the plurality of menu items is chosen.

3. The method of claim 1, wherein the step of performing the operation comprises:

displaying an inquiry message;

receiving a reply to the inquiry message from a user; and deciding whether or not to perform the operation corresponding to the chosen menu item according to the reply to the inquiry message.

4. The method of claim 1, wherein the step of performing the operation comprises:
performing the operation corresponding to the chosen menu item when a touch input is detected in an area where the chosen menu item is displayed.

5. The method of claim 1, further comprising:
choosing a number of menu items to be included in the operation control menu.

6. The method of claim 1, further comprising:
changing at least one of size and color of the chosen menu item so as to be distinguishable from other menu items of the plurality of menu items.

7. The method of claim 1, further comprising:
displaying the plurality of menu items of the operation control menu as icons.

8. A mobile terminal, comprising:
a first display module configured to be flexible and to display an operating screen;
a second display module configured to receive a touch input and to display an operation control menu including a plurality of menu items, the operating control menu being a menu for controlling the operating screen;
a sensing unit operatively connected to the first display module and configured to determine which portion of the first display module is bent or folded; and
a controller operatively connected to the sensing unit and configured to
choose one of the plurality of menu items of the operation control menu corresponding to the bent or folded portion of the first display module determined by the sensing unit, and
perform an operation corresponding to the chosen menu item and apply a result of the performed operation to the operation screen of the first display module,
wherein the first and second display modules are independently driven, and
wherein the controller is further configured to switch an operation mode of the mobile terminal if a predetermined portion of the first display module is bent or folded, the operation mode comprising a separate-operating mode and an integrated-operating mode.

9. The mobile terminal of claim 8, wherein, when a touch input is detected in an area where the chosen menu item is displayed, the controller is configured to control an operation to be performed corresponding to the chosen menu item.

10. The mobile terminal of claim 8, wherein the controller is configured to display an inquiry message and to decide whether or not to perform an operation corresponding to the chosen menu item according to a reply to the inquiry message.

11. The mobile terminal of claim 8, wherein the second display module is disposed on a level with the first display module and connected to the first display module.

12. A method of controlling a mobile terminal equipped with a flexible first display module and a second display module capable of receiving a touch input, the method comprising:
displaying, by the mobile terminal, an operating screen corresponding to a current operating mode on the first display module;
in response to bending or folding at least one portion of the first display module, displaying, by the mobile terminal, on the second display module an operation control menu, including a plurality of menu items, that can be executed in the current operating mode; and
when one of a plurality of menu items of the operation control menu is chosen via a touch, performing, by the mobile terminal, an operation corresponding to the chosen menu item and applying the performed operation to the operation screen of the first display module,
wherein the first and second display modules are independently driven,
the method further comprising switching an operation mode of the mobile terminal if a predetermined portion of the first display module is bent or folded, the operation mode comprising a separate-operating mode and an integrated-operating mode.

13. A mobile terminal, comprising:
a first display module configured to be flexible and to display an operating screen corresponding to a current operating mode;
a second display module configured to receive a touch input;
a sensing unit operatively connected to the first display module and configured to determine whether or not at least one portion of the first display module is bent or folded; and
a controller operatively connected to the sensing unit and configured to display, when data provided by the sensing unit indicates that the first display module is bent or folded, an operation control menu that can be executed in the current operating mode on the second display module,
wherein, when one of a plurality of menu items of the operation control menu is chosen via a touch, the controller is further configured to perform an operation corresponding to the chosen menu item and apply a result of the performed operation to the operation screen of the first display module,
wherein the first and second display modules are independently driven, and
wherein the controller is further configured to switch an operation mode of the mobile terminal if a predetermined portion of the first display module is bent or folded, the operation mode comprising a separate-operating mode and an integrated-operating mode.

14. A method of controlling a mobile terminal equipped with a flexible first display module and a second display module capable of receiving a touch input, the method comprising:
displaying, by the mobile terminal, a first operating-mode screen on the first display module;
displaying, by the mobile terminal, a second operating-mode screen associated with the first operating-mode screen on the second display module mode in response to bending or folding at least one portion of the first display module; and
when the at least one portion of the first display module is unbent or unfolded, displaying, by the mobile terminal, the second operating-mode screen on the first display module and displaying a third operating-mode screen associated with the second operating-mode screen on the second display module,
wherein the first and second display modules are independently driven,
the method further comprising switching an operation mode of the mobile terminal if a predetermined portion of the first display module is bent or folded, the operation mode comprising a separate-operating mode and an integrated-operating mode.

15. A mobile terminal, comprising:
a first display module configured to be flexible and display a first operating-mode screen;

a second display module configured to receive a touch input;

a sensing unit operatively connected to the first display module and configured to determine whether or not at least one portion of the first display module is bent or folded; and a controller operatively connected to the sensing unit and configured to display, when data provided by the sensing unit indicates that the first display module is bent or folded, a second operating-mode screen associated with the first operating-mode screen on the second display module, display the second operating-mode screen on the first display module, and when data provided by the sensing unit indicates that the at least one portion of the first display module is unbent or unfolded, display a third operating-mode screen associated with the second operating-mode screen on the second display module, wherein the first and second display modules are independently driven, and wherein the controller is further configured to switch an operation mode of the mobile terminal if a predetermined portion of the first display module is bent or folded, the operation mode comprising a separate-operating mode and an integrated-operating mode.

16. A method of controlling a mobile terminal equipped with a flexible first display module and a second display module capable of receiving a touch input, the method comprising:

displaying, by the mobile terminal, an operating screen including an operation control menu having a plurality of menu items on the first and second display modules;

scrolling, by the mobile terminal, the operation screen displayed on the first and second display modules when at least one portion of the first display module is bent or folded;

displaying, by the mobile terminal, the operation control menu on the second display module according to the scrolling of the operation screen;

receiving, by the mobile terminal, a touch input to choose one of the plurality of menu items; and performing, by the mobile terminal, an operation corresponding to the chosen menu item and applying a result of the performed operation to the operation screen, wherein the first and second display modules are driven as a single display, the method further comprising switching an operation mode of the mobile terminal if a predetermined portion of the first display module is bent or folded, the operation mode comprising a separate-operating mode and an integrated-operating mode.

17. The method of claim 16, wherein the step of scrolling the operating screen comprises:

scrolling the operating screen in response to a touch-and-drag input detected on the second display module.

18. The method of claim 16, further comprising:

scrolling the operating screen back to its original position when no user input is received within a predetermined amount of time after the step of scrolling is completed.

19. A mobile terminal, comprising:

a first display module configured to be flexible and to display an operating screen including an operation control menu having a plurality of menu items;

a second display module connected to the first display module and configured to receive a touch input and to display the operating screen;

a sensing unit operatively connected to the first display module and configured to determine whether at least one portion of the first display module is bent or folded; and a controller operatively connected to the sensing unit and configured to scroll the operation screen displayed on the first and second display modules, and display the operation control menu on the second display module according to the scrolling of the operation screen when data provided by the sensing unit indicates that the at least one portion of the first display module is bent or folded, wherein the controller is further configured to perform an operation corresponding to a touched one of the plurality of menu items and apply the performed operation to the operation screen, wherein the first and second display modules are driven as a single display, and wherein the controller is further configured to switch an operation mode of the mobile terminal if a predetermined portion of the first display module is bent or folded, the operation mode comprising a separate-operating mode and an integrated-operating mode.

20. The mobile terminal of claim 19, wherein the controller is configured to scroll the operating screen in response to a touch-and-drag input detected on the second display module.

21. The mobile terminal of claim 19, wherein the controller is configured to scroll the operating screen back to its original position when no user input is received within a predetermined amount of time after an initial scroll is ended.

* * * * *